E. S. BARTLETT, Sr.
ANIMAL SHEARS.
APPLICATION FILED MAR. 6, 1917.
1,301,089.
Patented Apr. 22, 1919.
2 SHEETS—SHEET 1.
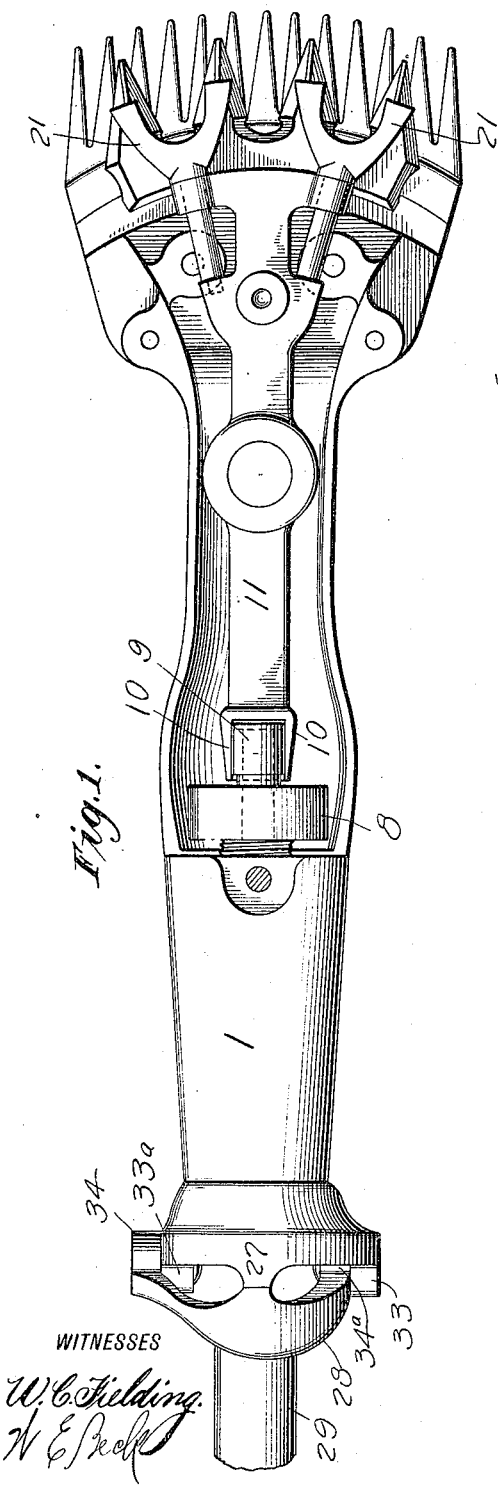
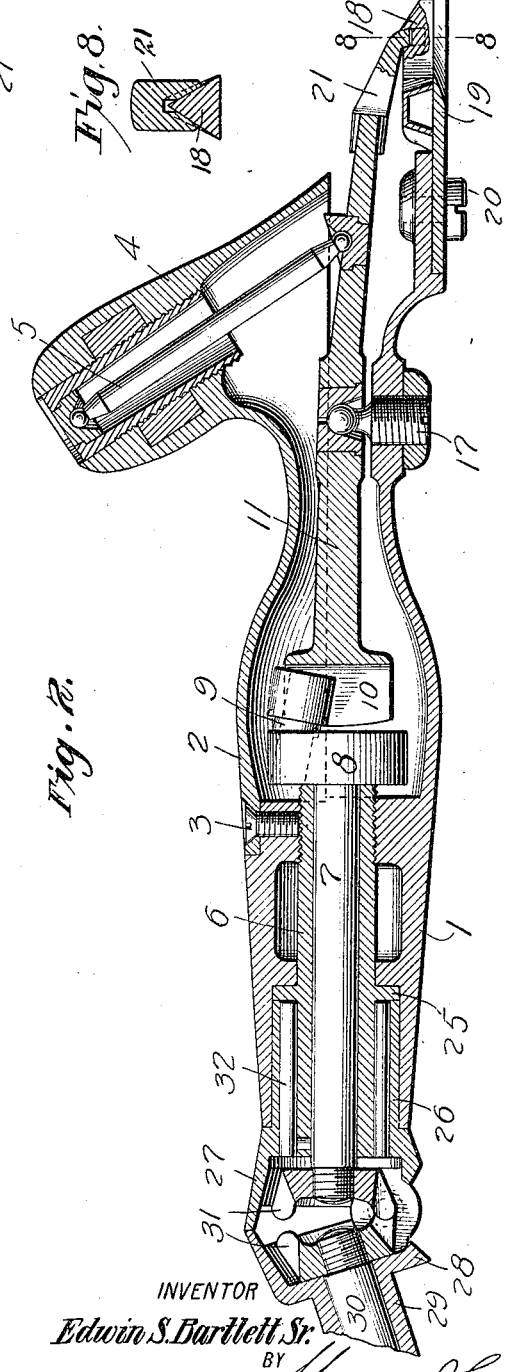
WITNESSES
W. C. Fielding
W. E. Beck
INVENTOR
Edwin S. Bartlett Sr.
BY
ATTORNEYS E. S. BARTLETT, Sr.
ANIMAL SHEARS.
APPLICATION FILED MAR. 6, 1917.
1,301,089.
Patented Apr. 22, 1919.
2 SHEETS—SHEET 2.
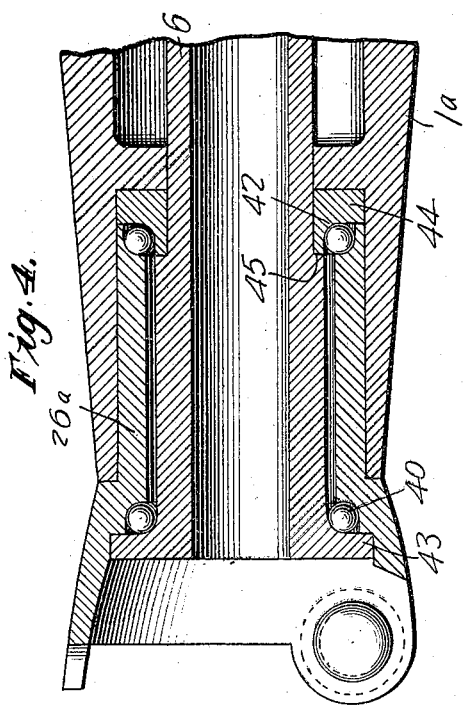
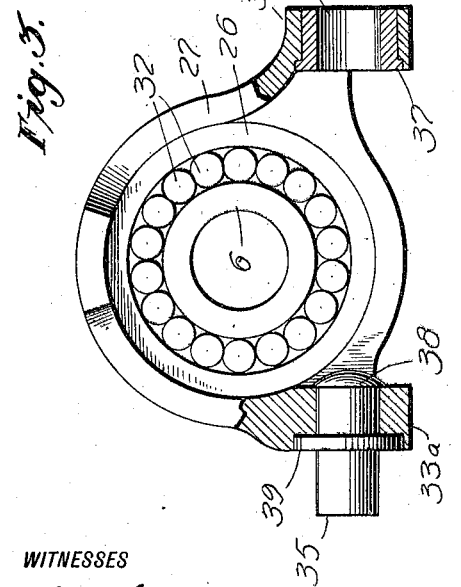
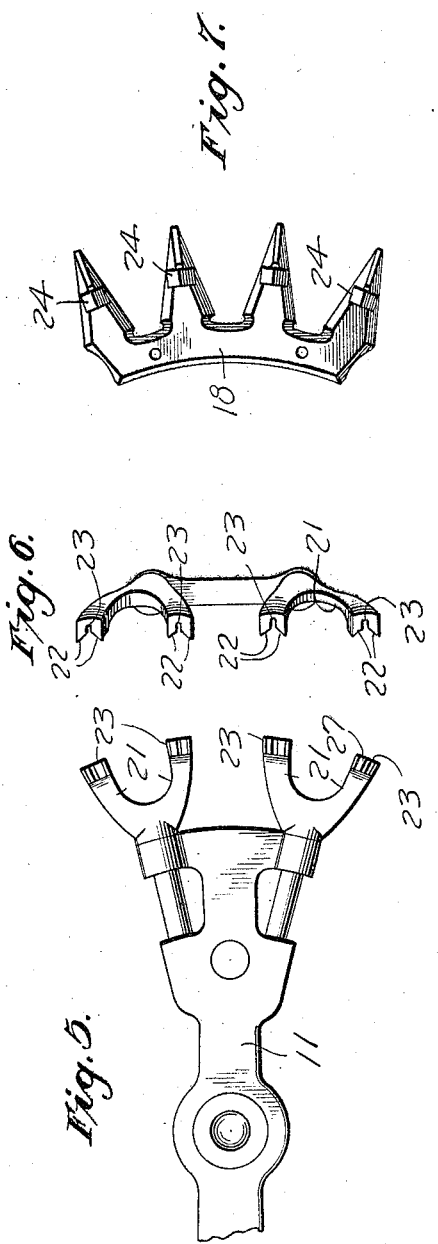
WITNESSES
W. C. Fielding
N. E. Beck
INVENTOR
Edwin S. Bartlett, Sr.
BY
ATTORNEYS

UNITED STATES PATENT OFFICE.

EDWIN STANLEY BARTLETT, SR., OF BUTTE, MONTANA.

ANIMAL-SHEARS.

1,301,089. Specification of Letters Patent. Patented Apr. 22, 1919.

Application filed March 6, 1917. Serial No. 152,631.

*To all whom it may concern:*

Be it known that I, EDWIN STANLEY BARTLETT, Sr., a citizen of the United States, and a resident of Butte, in the county of Silverbow and State of Montana, have invented an Improvement in Animal-Shears, of which the following is a specification.

My invention is an improvement in shears, and has for its object to provide new and improved mechanism for connecting the shears with the operating mechanism, and for connecting the operating fork with the blade.

In the drawings:

Figure 1 is a top plan view of the improved shears with the cover removed.

Fig. 2 is a longitudinal vertical section.

Fig. 3 is an end view of the housing for the operating shaft.

Fig. 4 is an enlarged longitudinal section through the said housing showing the modified form of bearing.

Fig. 5 is a top plan view of the operating fork.

Fig. 6 is an end view of the same.

Fig. 7 is a top plan view of the movable cutting blade.

Fig. 8 is a longitudinal vertical section on the line 8—8 of Fig. 1.

The present embodiment of the invention is an improvement over my prior Patent No. 1,299,379, granted December 19, 1916, and the device comprises a casing 1 having a removable cover 2, held in place by means of screws 3, and provided at its outer end with a hood or dome portion 4 in which is housed the tensioning device indicated generally at 5, and forming the subject-matter of the aforesaid patent.

Within this casing is mounted a housing 6 for the drive shaft 7, the said shaft being journaled in the housing, as shown, and being provided at its inner end with a crank disk 8 having a crank pin 9, which is connected with the inner forked end 10 of the vibrator 11, the crank pin being inserted between the arms of the fork and moving between the same when the shaft is rotated, to operate the vibrator. The vibrator is fulcrumed on a pivot post 17, and when caused to vibrate will operate the movable cutter 18 carried thereby, and which coöperates with the fixed cutter 19 connected to the casing 1, as indicated at 20. The tensioning device bears against the vibrator between the cutter 18 and the pivot post 17, to hold the movable cutter in firm contact with the fixed cutter. The end of the vibrator adjacent to the cutter 18 is provided with two forks 21, and the arms of these forks engage the movable cutter. The said arms extend outwardly and downwardly, as shown in Figs. 2 and 6, and each arm is provided on its under side and at its outer end with a V-shaped recess 22. The bottoms of the recesses are extended, as shown at 22, the extensions having parallel side walls, as shown, and these recesses engage beveled surfaces or bearings 24 on the teeth of the movable cutter 18. It will be noticed that the said movable cutter has four teeth, so that each tooth is engaged by one of the arms of the fork. The extensions 23 provide a clearance at the bottom of each notch or recess 22, so that as the fork arms wear the side of the notches are left free to adjust themselves to the knife bearings.

It will be noticed from an inspection of Figs. 7 and 8 that the bearings 24 are formed by cutting away the material of the fingers of the cutter 18 from the central line in each direction. The central line of the bearing is flush with the top of the finger, but the sides of the bearing have shoulders at their ends, and the cutter is held in place by the engagement of the elements 21 at the points 22 with the shoulders.

The end of the casing 1 remote from the notches is internally enlarged, to receive an annular rib 25 on the housing 6, and a bushing 26 fits within this enlarged portion, the inner edge of the bushing bearing against the rib. The outer end of the bushing is enlarged as indicated at 27 to form one of the members of a joint, the other member 28 of the joint being connected to the housing 29 of the operating shaft 30. The operating shaft and the driving shaft have interengaging gears 31 for constraining the driving shaft to rotate with the transmission shaft.

The bushing 26 is rotatable within the casing 1 and upon the housing 6, and a roller bearing indicated generally at 32 is arranged between the bushing and the housing. The enlargements 27 and 28 have ears 33, 33ª, 34 and 34ª, respectively, which lap upon each other, and the adjacent ears are pivotally connected by pivot pins 35. The ear 33 laps upon the ear 34ª, while the ear 33ª laps upon the ear 34. The ears 33 and 34 carry bushings 36, each of which has a marginal external rib 37 at its inner end, and the ears 33ª and 34ª carry the pivot pins 35.

Each of these pins, as shown more particularly in Fig. 3, is headed at its inner end and is provided intermediate its ends with a radial rib 39 which fits within a similarly shaped recess in the outer ends of the ears 33ª and 34ª. Thus a hinged connection is provided between the enlargements 27 and 28, and a rotatable connection between the bushing 26 and the casing 1, thus providing a universal joint connection between the housing 29 and the casing 1. When the pivotal connection between the housing 29 and the bushing 26 becomes worn, it may be renewed, by providing new pivot pins 35 and new bushings 36. The pivot pins may be renewed by cutting away the heads 38, and the two parts of the joint may be separated when the gears are not in mesh.

If desired, the roller bearing shown in Fig. 2 may be replaced by a double ball bearing, as shown in Fig. 4. In this construction the housing 6ª is arranged within the casing 1ª, and the bushing 26ª is arranged between the housing 6ª and the casing 1ª. This casing has at each end an annular groove 40, which coöperates with grooves 41 and 42 at a radial rib 43 on the outer end of the housing 6ª, and on a collar 44 which encircles the housing 6ª. An annular rib 45 is formed on the housing, against which the collar bears. The bushing in Fig. 2 is threaded into the casing 1 at its inner end, and the bushing 6ª may be similarly connected with the casing 1ª.

I claim:

1. In shears, the combination with the fixed cutter and the movable cutter, of a vibrator having arms registering with the teeth of the movable cutter, each arm having a V-shaped recess and each tooth having a bearing for the arm consisting of oppositely arranged beveled surfaces meeting at the top of the tooth, shoulders being formed at the ends of the beveled surfaces for engagement by the arms to limit the longitudinal movement of the arms with respect to the cutter, each recess having an extension at its bottom provided with parallel side walls.

2. In shears, the combination with the fixed cutter and the movable cutter, of a vibrator having arms registering with the teeth of the movable cutter, each arm having a V-shaped recess and each tooth having a bearing for the arm consisting of oppositely arranged beveled surfaces meeting at the top of the tooth, shoulders being formed at the ends of the beveled surfaces for engagement by the arms to limit the longitudinal movement of the arms with respect to the cutter.

EDWIN STANLEY BARTLETT, Sr.

Witnesses to signature:
T. J. Davis,
Lillian Hart.

Copies of this patent may be obtained for five cents each, by addressing the "Commissioner of Patents, Washington, D. C."